United States Patent
David et al.

(10) Patent No.: US 9,494,110 B2
(45) Date of Patent: Nov. 15, 2016

(54) SYSTEM FOR REDUCING THE DYNAMIC BEHAVIOR OF THE MOVABLE SEGMENT OF A DEPLOYABLE NOZZLE FOR A ROCKET ENGINE

(75) Inventors: Noël David, Breuilpont (FR); Alain Pyre, Saint Just (FR)

(73) Assignee: SNECMA, Paris (FR)

(*) Notice: Subject to any disclaimer, the term of this patent is extended or adjusted under 35 U.S.C. 154(b) by 466 days.

(21) Appl. No.: 14/119,648

(22) PCT Filed: May 15, 2012

(86) PCT No.: PCT/FR2012/051091
§ 371 (c)(1),
(2), (4) Date: Feb. 11, 2014

(87) PCT Pub. No.: WO2012/160297
PCT Pub. Date: Nov. 29, 2012

(65) Prior Publication Data
US 2014/0175191 A1    Jun. 26, 2014

(30) Foreign Application Priority Data
May 23, 2011 (FR) .................................. 11 54454

(51) Int. Cl.
*F02K 9/00* (2006.01)
*F02K 9/97* (2006.01)

(52) U.S. Cl.
CPC ............ *F02K 9/976* (2013.01); *F05D 2260/96* (2013.01); *F05D 2300/433* (2013.01); *F05D 2300/614* (2013.01)

(58) Field of Classification Search
CPC ...................... F05D 2260/96; F05D 2300/433; F05D 2300/614; F02K 1/06; F02K 1/09; F02K 9/97; F02K 9/974; F02K 9/976; F02K 9/978

USPC ............ 239/265.19, 265.37, 265.33, 265.15; 60/771, 770, 232
See application file for complete search history.

(56) References Cited

U.S. PATENT DOCUMENTS 2,557,435 A * 6/1951 Imbert ...................... F02K 1/08
                                                              239/265.25
2,557,883 A * 6/1951 Miller ...................... F02K 1/08
                                                              239/265.25
(Continued)

FOREIGN PATENT DOCUMENTS

EP    0 626 513    11/1994
FR    2 757 571    6/1998
(Continued)

OTHER PUBLICATIONS

International Search Report Issued Aug. 31, 2012 in PCT/FR12/051091 Filed May 15, 2012.

*Primary Examiner* — Peter Helvey
(74) *Attorney, Agent, or Firm* — Oblon, McClelland, Maier & Neustadt, L.L.P.

(57) ABSTRACT

A deployable nozzle for a rocket engine, the nozzle including at least a stationary divergent segment and a movable divergent segment that is coaxial about the stationary divergent segment and configured to move along the stationary divergent segment from a retracted position towards a deployed position. The deployable nozzle further includes a transverse stiffener that is prestressed in tension and that extends transversely relative to the movable divergent segment in a vicinity of a downstream end of the movable divergent segment between at least two points at a periphery of an inside wall of the movable divergent segment.

13 Claims, 4 Drawing Sheets

(56) References Cited

U.S. PATENT DOCUMENTS

| | | | | |
|---|---|---|---|---|
| 2,585,270 A * | 2/1952 | Plath | ............... | F02K 1/08 239/265.25 |
| 3,270,504 A * | 9/1966 | Ward | ............... | F02K 9/976 239/265.33 |
| 3,436,020 A * | 4/1969 | Duthion | ............... | F02K 1/38 181/220 |
| 3,526,365 A * | 9/1970 | Ursery | ............... | F02K 9/976 239/265.43 |
| 3,534,908 A * | 10/1970 | Holland | ............... | F02K 9/86 239/12 |
| 3,711,027 A * | 1/1973 | Carey | ............... | F02K 9/976 239/265.19 |
| 4,146,180 A * | 3/1979 | Frosch | ............... | F02K 9/978 138/96 R |
| 4,162,040 A * | 7/1979 | Carey | ............... | F02K 9/976 239/265.33 |
| 4,213,566 A * | 7/1980 | Miltenberger | ............... | F02K 9/976 239/265.43 |
| 4,349,155 A * | 9/1982 | Donguy | ............... | E05D 3/122 239/265.33 |
| 4,383,407 A | 5/1983 | Inman | | |
| 4,411,399 A * | 10/1983 | Hapke | ............... | F02K 1/78 239/265.33 |
| 4,489,889 A * | 12/1984 | Inman | ............... | F02K 9/976 239/265.33 |
| 4,676,436 A * | 6/1987 | Willis | ............... | F02K 9/976 239/265.33 |
| 4,694,645 A * | 9/1987 | Flyborg | ............... | B63H 5/14 114/166 |
| 4,706,886 A * | 11/1987 | Jencek | ............... | F02K 9/978 239/265.33 |
| 4,739,932 A * | 4/1988 | Szuminski | ............... | F02K 1/08 239/265.19 |
| 4,779,799 A * | 10/1988 | Jencek | ............... | F02K 9/976 239/265.19 |
| 4,802,629 A * | 2/1989 | Klees | ............... | F02K 1/085 239/265.19 |
| 4,807,434 A * | 2/1989 | Jurich | ............... | F02K 1/72 239/265.29 |
| 5,211,008 A * | 5/1993 | Fage | ............... | F02K 1/74 239/265.19 |
| 5,282,576 A * | 2/1994 | Chatenet | ............... | F02K 9/976 239/265.11 |
| 5,481,870 A | 1/1996 | Pacou et al. | | |
| 5,490,629 A * | 2/1996 | Bonniot | ............... | F02K 9/978 239/265.15 |
| 5,641,123 A * | 6/1997 | Kishimoto | ............... | F02K 9/976 239/265.15 |
| 6,311,478 B1 * | 11/2001 | Elorriaga Vicario | ............... | F02K 1/008 60/232 |
| 6,418,710 B1 | 7/2002 | Perrier et al. | | |
| 7,571,610 B2 * | 8/2009 | Kretschmer | ............... | F02K 9/976 60/232 |
| 8,312,726 B2 * | 11/2012 | Wong | ............... | F01D 25/162 415/142 |
| 2012/0067052 A1 | 3/2012 | Condaminet et al. | | |

FOREIGN PATENT DOCUMENTS

| | | |
|---|---|---|
| FR | 2 944 063 | 10/2010 |
| JP | 6 056135 | 7/1994 |

* cited by examiner

SYSTEM FOR REDUCING THE DYNAMIC BEHAVIOR OF THE MOVABLE SEGMENT OF A DEPLOYABLE NOZZLE FOR A ROCKET ENGINE

FIELD OF THE INVENTION

The present invention relates to a deployable nozzle for a rocket engine, and more particularly but not exclusively, to a deployable nozzle for a top-stage engine of a rocket, and to a rocket engine including such a nozzle. In the meaning of the invention, a nozzle is a duct of a rocket engine through which combustion gas is ejected.

BACKGROUND OF THE INVENTION

A known deployable nozzle for a rocket engine comprises at least a stationary divergent segment and a movable divergent segment that is coaxial about the stationary divergent segment and suitable for moving along the stationary divergent segment from a retracted position towards a deployed position.

That type of deployable nozzle is generally fabricated in such a manner that its walls are as thin as possible, within limits set by mechanical strength and ability to withstand high temperature, in order to reduce its weight and thus optimize the performance of the engine on which it is mounted. Nevertheless, the movable divergent segment is particularly flexible while it is in the retracted position, such that the vibration to which it is subjected can lead to high levels of mechanical loading that can degrade it to such an extent as to prevent it from operating properly. For example, while the nozzle is retracted between two stages of a rocket, the vibration to which it is subjected during launching of the rocket can crack or even break the movable divergent segment.

An object of the present invention is to remedy the above-mentioned drawbacks, at least in part.

SUMMARY OF THE INVENTION

The invention achieves this object by providing a deployable nozzle of the above-specified type further comprising a transverse stiffener that is prestressed in tension and that extends transversely relative to the movable divergent segment in the vicinity of a downstream end of the movable divergent segment between at least two points at the periphery of an inside wall of the movable divergent segment.

The stationary and movable divergent segments, and more generally the deployable nozzle, define an axial direction. The movable divergent segment moves along the axial direction while extending around the stationary divergent segment. The stationary divergent segment is for attaching to a point that is stationary relative to the movable divergent segment. Upstream and downstream for the deployable nozzle are defined relative to the flow direction of combustion gas through the nozzle. Since the stationary and movable segments are both divergent, the sections of their upstream ends are smaller than the sections of their downstream ends. It can be understood that in the retracted position (or folded position), the downstream end of the movable divergent segment is closer to the downstream end of the stationary divergent segment than is the upstream end of the movable divergent segment. Conversely, in the deployed position (or extended position), the upstream end of the movable divergent segment is closer to the downstream end of the stationary divergent segment than is the downstream end of the movable divergent segment.

The "vicinity" of the downstream of the movable divergent segment is defined as being the environment of the movable divergent segment that extends axially over 10% of the total axial extent of the movable divergent segment either way from its downstream end; the portion of the movable divergent segment that extends axially over 10% of the total axial extent of the movable divergent segment from the downstream end naturally being included. Consequently, this segment portion is referred to as the "downstream end portion". The terms "vicinity" and "end portion" apply equally to the upstream end, and also to the stationary divergent segment, and more generally to the nozzle.

It can be understood that the stiffener extends between two distinct inside points of the downstream end portion of the movable divergent segment. By arranging the stiffener in this way, the space it occupies in the environment of the deployable nozzle is small, so it does not constitute any hindrance while the divergent segments are retracted. This is particularly advantageous when the nozzle is located between two stages of a rocket. In addition, this position for the stiffener serves to ensure that the stiffener does not hinder deployment of the nozzle. Furthermore, still because of this positioning, the stiffener does not impede the flow of combustion gas through the nozzle when the engine starts or is operating.

Since the stiffener is prestressed in tension, the at least two points are coupled together so that their relative movements due to vibration are limited or even prevented. In particular, the resonant modes of lobes of the ovalization type, three lobes, four lobes, etc., of the movable divergent segment are blocked, or their deformation amplitudes are limited. Furthermore, the stiffener is advantageously more flexible than the movable divergent segment such that the resonant vibrations of the stiffener do not generate additional force in the vicinity of said points.

It can be understood that the greater the number of points connected together by the stiffener, the greater the number of resonant modes that are blocked. For example, when the nozzle forms a body of revolution about the axial direction, a stiffener that extends between twelve points that are uniformly distributed angularly around the axial direction serves to block the first five resonant modes of vibration (i.e. the lower-frequency resonant modes) of the movable divergent segment.

Thus, since the first resonant modes in vibration of the movable divergent segment are blocked, the external vibration to which it is subjected does not excite those resonant modes. Consequently, the higher energy resonance phenomena that are associated with the lower frequency resonant modes that are blocked by the stiffener disappear. The higher frequency resonance phenomena present lower energy and present little or no risk of deteriorating the movable divergent segment.

Consequently, since the mechanical stresses due to vibration in the movable divergent segment of the deployable nozzle of the invention are smaller than in the movable divergent segment of prior art deployable nozzles, the walls of the movable divergent segment of the nozzle of the invention may be thinner than the walls of the movable divergent segment of the prior art, while withstanding an equivalent vibration spectrum. This reduction in thickness enables the nozzle of the invention to be lighter than prior art nozzles and thus enables the performance of the engine on which it is mounted to be improved.

Advantageously, the transverse stiffener extends in a transverse plane of the movable divergent segment.

A transverse plane is a plane perpendicular to the axial direction of the movable divergent segment. This improves blocking of the first resonant modes of the movable divergent segment.

In a variant, the stiffener comprises at least one tie extending diametrically and having two ends, each end being connected to a point of the periphery of the inside wall of the movable divergent segment.

A tie that extends diametrically is a tie that directly connects together two points of the periphery of the inside wall of the movable divergent segment that are opposite each other about the central axis of the movable divergent segment, the tie intersecting the axis, and with this applying regardless of the shape of the cross-section of the movable divergent segment. Preferably, the cross-section of the movable divergent segment is circular. The tie then extends along a diameter of the circular section. Such a tie is easier to install and its prestress in tension is easier to adjust than a tie that does not extend diametrically. Preferably, the stiffener has three ties all extending diametrically and each having two ends, each end of each tie being connected to a respective point of the periphery of the inside wall of the movable divergent segment. This serves to improve blocking of the first vibration mode.

In another variant, the stiffener comprises at least two ties extending radially from a primary central body.

A tie that extends radially is a tie that extends from the central body arranged on the central axis of the movable divergent segment towards a point on the inside periphery of the inside wall of the movable divergent segment, with this applying regardless of the shape of the cross-section of the movable divergent segment. Thus, a radial tie presents a first end connected to the central body and a second end connected to the wall of the movable divergent segment. Preferably, the cross-section of the movable divergent segment is circular. The tie then extends along a radius of the circular section, or in a variant it extends like the spokes of a bicycle wheel (i.e. without being directed through the central geometrical axis of the movable divergent segment, but towards the periphery of a central axis presenting a certain diameter). It should be observed that the central body is said to be "primary" relative to a central body that is described below and that is said to be "secondary". Preferably, the stiffener has at least three ties extending radially from a primary central body. This makes it possible to improve the blocking of the first vibration modes.

Advantageously, the stiffener comprises adjustment means for adjusting the prestress tension.

By using the means for adjusting the prestress in tension, it is possible to apply predetermined and controlled levels of prestress. By way of example, the prestress means may comprise a tensioner that is adjustable by means of a screw thread system.

Advantageously, the stiffener comprises at least one cord made of polymer fibers.

A polymer fiber cord is light in weight. Thus, the added weight constituted by the stiffener compared with the remainder of the nozzle is small relative to the weight of the nozzle. This makes it possible to avoid penalizing the efficiency of the engine to which the nozzle is fastened. It can be understood that the cord acts as a tie. Furthermore, a cord occupies little space so the obstruction constituted by the transverse stiffener in the movable divergent segment is negligible relative to the total section of the movable divergent segment and it does not disturb the jet of combustion gas, in particular when igniting the engine to which the deployable nozzle is fastened. Each tie preferably comprises a polymer fiber cord. Advantageously, the stiffener has at least three polymer fiber cords.

Preferably, the cord is made of aramid fibers (or Kevlar, registered trademark, fibers) or the equivalent. The term "equivalent" covers a fiber cord presenting a coefficient of thermal expansion, a melting or vaporization temperature, stiffness, and sensitivity to creep that are of the same order of magnitude as a cord made of aramid fibers. For example, the cord could equally well be made of polyester fibers.

A cord of aramid or equivalent fibers presents the advantage of not creeping, i.e. of being insensitive to creep, while presenting satisfactory traction stiffness. Thus, the tension prestress in such a cord varies little or not at all over time. Furthermore, this aramid fiber cord presents a small coefficient of thermal expansion. Thus, the tension prestress in such a cord varies little or not at all, even when the cord is subjected to temperature variations, e.g. when the nozzle is mounted on an engine arranged between cryogenic stages.

Furthermore, such a cord melts and decomposes in a few seconds under the effect of the hot combustion gas ejected by the engine. Thus, when the nozzle is deployed and the engine to which it is fastened is in operation, the decomposition of the cords of the stiffener serve to avoid impeding the ejection of combustion gas from the nozzle. In addition, the fact that the cord disintegrates under the effect of heat makes it possible to avoid ejecting solid pieces when the nozzle is deployed and the engine is operating, thereby avoiding any risk of damaging the engine itself, or for example the upper stage to which is attached or the lower stage from which it has just been released.

Advantageously, the stiffener comprises fastener means for fastening to the movable divergent segment and secured to said movable divergent segment.

Since they are secured to the movable divergent segment, the fastener means are not ejected from the nozzle, e.g. when the cord melts and disintegrates, and as a result they do not present any risk of causing damage by being thrown out, e.g. towards the engine of the upper stage or of the lower stage.

Advantageously, the fastener means do not extend inside the movable divergent segment. Thus, the fastener means do not disturb the flow of combustion gas.

Advantageously, in the retracted position, the stiffener cooperates with the downstream end portion of the stationary divergent segment.

It can be understood that the stiffener cooperates directly or via one or more intermediate part(s) with the stationary divergent segment. This makes it possible, particularly, but not exclusively, to block resonant modes of the rigid body in tilting and in moving the movable divergent segment radially relative to the stationary divergent segment. This further reduces vibration and the risk of damage to the movable divergent segment, and reduces the risk of collision between the movable divergent segment and the stationary divergent segment.

Advantageously, the stationary divergent segment and the movable divergent segment present, in the vicinity of their downstream ends, complementary centering means that cooperate with each other in the retracted position.

The complementary centering means serve firstly to hold the movable divergent segment in position relative to the stationary divergent segment, and secondly to block radial movements in translation and/or tilting movements of the movable divergent segment relative to the stationary divergent segment, and in particular to block resonant modes of the rigid body.

In an embodiment, the stiffener carries an annular centering skirt that cooperates with a downstream end portion of the stationary divergent segment in the retracted position by mutually engaging therewith.

It can be understood that in this embodiment the complementary means are formed firstly by the annular skirt and secondly by the downstream end portion of the stationary divergent segment. For example, the skirt is adapted to fit closely to the downstream end portion of the stationary divergent segment. In the retracted position, the prestress of the stiffener enables the stiffener to keep the skirt engaged with the downstream end portion of the stationary divergent segment, and possibly also to maintain contact between them.

Advantageously, the skirt cooperates with an inside wall of the end portion of the stationary divergent segment. The skirt is preferably made of material that is light (compared with the weight of the deployable nozzle) and that melts or vaporizes easily under the effect of the hot combustion gas. For example, the skirt may be made of rigid foam and/or it may present a honeycomb internal structure. Such a skirt may be made for example out of polyurethane foam or out of an epoxy resin composite material for the outer walls and out of polypropylene for the honeycomb internal structure.

In another embodiment, the stiffener has at least two ties extending radially from a primary central body, and the downstream end of the stationary divergent segment carries a secondary central body with which the primary central body cooperates in the retracted position by mutual engagement therewith.

In this embodiment, it can be understood that the complementary centering means are formed firstly by the primary central body and secondly by the secondary central body. For example, the primary central body and the secondary central body cooperate by tenon-and-mortice type mutual engagement.

Advantageously, the stationary divergent segment includes a transverse stiffener prestressed in tension comprising at least two ties extending radially in the vicinity of a downstream end of the stationary divergent segment, between at least two points of the periphery of an inside wall of the stationary divergent segment from the secondary central body.

With the stiffener of the stationary divergent segment blocking the first resonant modes of vibration of the stationary divergent segment, this correspondingly increases the reliability of the deployable nozzle.

Advantageously, in order to reduce the mass added by the stiffener(s), the primary central body and/or the secondary central body should be made of material that is light in weight (compared with the weight of the deployable nozzle). Advantageously, in order to avoid ejecting solid pieces, the primary central body and/or the secondary central body should be made of a material that melts or vaporizes easily under the effect of the hot combustion gases. For example, the primary body and/or the secondary body should be made of aramid fibers or of polyamide (or nylon) fibers.

The invention also provides a rocket engine including at least one deployable nozzle of the invention.

BRIEF DESCRIPTION OF THE DRAWINGS

The invention and its advantages can be better understood on reading the following detailed description of various embodiments of the invention given as non-limiting examples. The description refers to the accompanying drawings, in which.

DETAILED DESCRIPTION OF EMBODIMENTS

Figure 1:
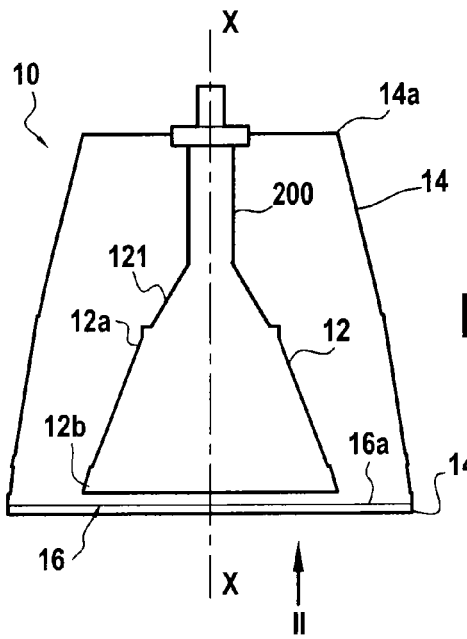
FIG. 1 shows a first embodiment of the deployable nozzle of the invention in the retracted position.

FIG. 1 shows a first embodiment of a deployable nozzle of the invention for a rocket engine, the nozzle being shown in the retracted position. The deployable nozzle 10 comprises a stationary divergent segment 12 and a movable divergent segment 14, and it extends along an axis X (or axial direction X). The stationary and movable divergent segments are frustoconical in shape about the axis X. The movable divergent segment 14 slides along the axis X and is coaxial about the stationary divergent segment 12. The stationary divergent segment 12 presents a coupling portion 121 fastened to the outlet of a propulsion chamber 200 of a rocket engine. Combustion gas flows in the deployable nozzle 10 from the propulsion chamber 200 via the coupling portion 121. Thus, the upstream end 12a of the stationary divergent segment 12 is arranged beside the coupling portion 121, while the downstream end 12b of the stationary divergent segment 12 is arranged remote therefrom. In the same manner, the upstream end 12a of the movable divergent segment 14 is arranged beside the coupling portion 121 while the downstream end 14b of the movable divergent segment is arranged remote therefrom.

Figure 2:
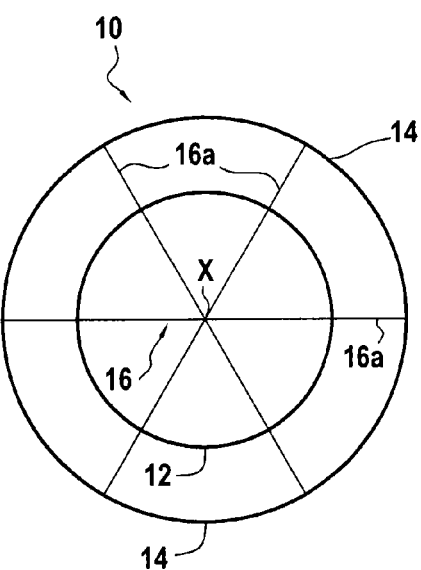
FIG. 2 shows the FIG. 1 deployable nozzle seen looking in the axial direction along arrow II of FIG. 1.

A transverse stiffener 16 extends in a transverse plane of the movable divergent segment 14 perpendicular to the axis X, in the vicinity of its downstream end 14b. With reference to FIG. 2, the stiffener 16 comprises three aramid fiber cords 16a extending diametrically so as to form three ties. The cords 16a are angularly equidistant. Thus, in this example, each cord is spaced at 60° (sixty degrees of angle) from the adjacent cords. Each cord 16a has two ends, these two ends connecting together two diametrically opposite points of the inside wall of the movable divergent segment 14. In a variant, the stiffener 16 could comprise only one, two, or more than three cords 16a.

Figure 3:
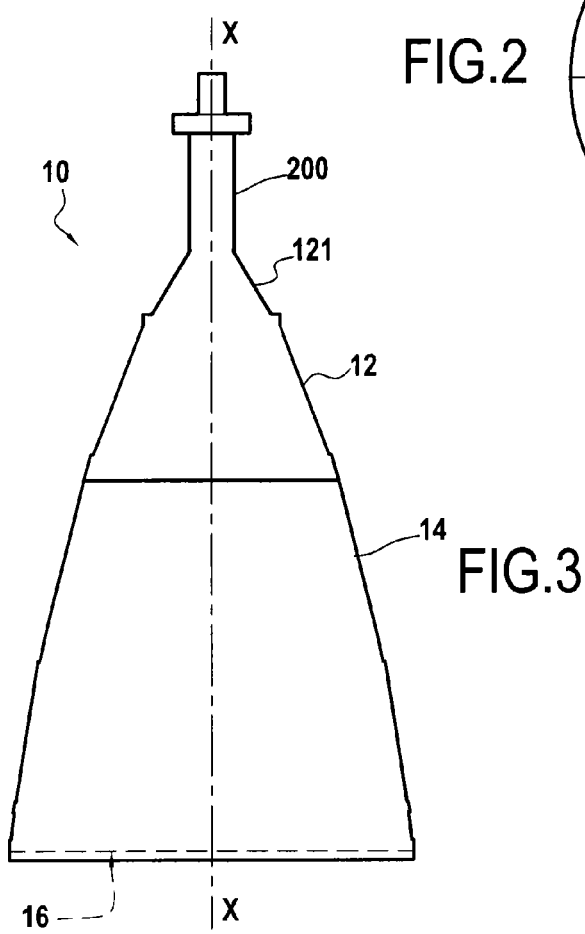
FIG. 3 shows the FIG. 1 deployable nozzle in the deployed position.

With reference to FIG. 3, the deployable nozzle 10 is shown in the deployed position, the engine (not shown) is in operation, and the stiffener 16, represented by dashed lines, has been melted by the hot combustion gas from the engine.

Figure 4:
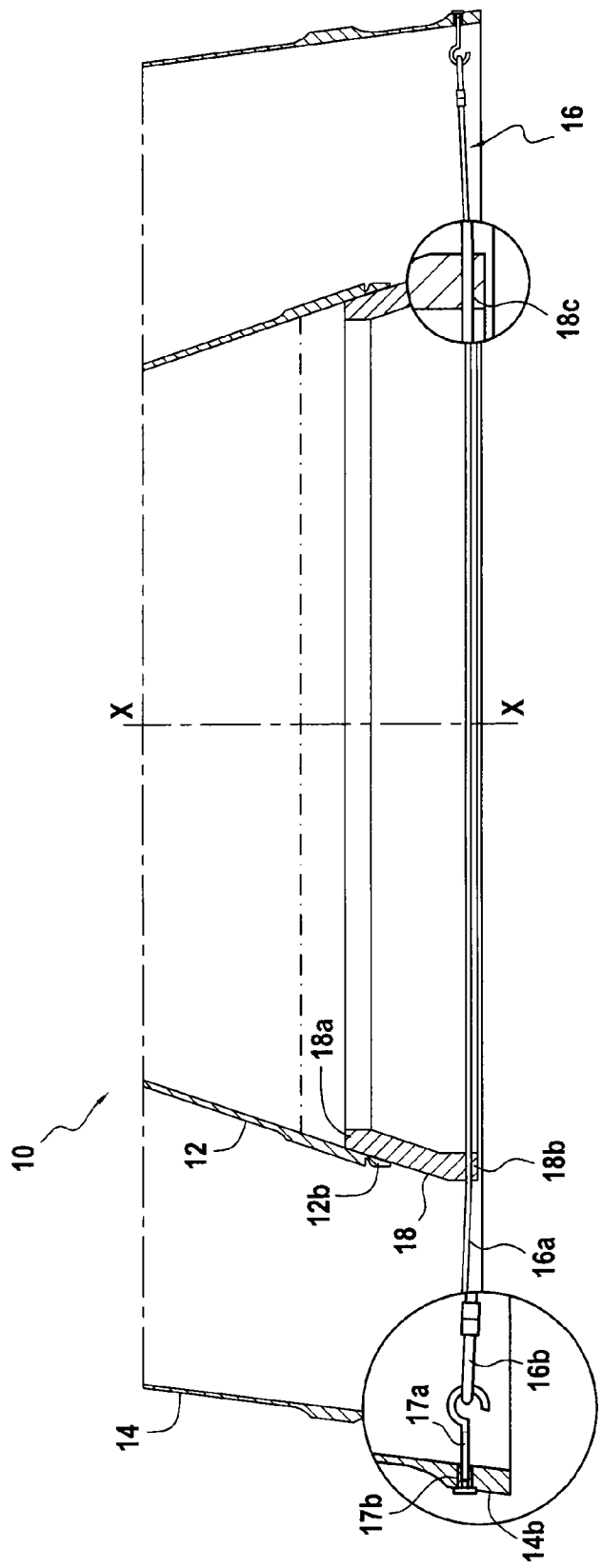
FIG. 4 shows the FIG. 1 deployable nozzle fitted with an annular centering skirt.

FIG. 4 shows a variant in the deployed position of the FIG. 1 deployable nozzle, in which the stiffener 16 carries a single-piece annular centering skirt 18 of rigid polyurethane foam. The skirt 18 extends axially along the axis X and is frustoconical in shape. The diameter of the upstream end 18a of the skirt 18 is less than the diameter of the downstream end 12b of the stationary divergent segment 12, while the diameter of the downstream end 18b of the skirt 18 is greater than the diameter of the downstream end 12b of the stationary divergent segment 12. Thus, along its axial extent, the skirt 18 penetrates in part inside the stationary divergent segment 12 and its outside wall cooperates with the inside wall of the stationary divergent segment 12 by bearing thereagainst. The stiffener 16 holds the skirt 18 against the stationary divergent segment 12. As shown in FIG. 4, this thrust causes the cords 16a to flex. The skirt 18 is supported by the cords 16a. For this purpose, the cords 16a pass through the skirt 18, through the thickness thereof, via holes 18c, the cords 16a being capable of sliding in the holes 18c.

FIG. 4 is a detailed view of the fastener 17 of the cords 16a to the movable divergent segment 14. Each fastener 17 comprises a hook 17a with a base that is threaded and has a nut 17b screwed thereon to present a shoulder for cooperating with the outside wall of the movable divergent segment 14 by bearing thereagainst. Each end of the cords 16a is fastened to a hook 17a via a loop 16b. By using the nut 17b, it is possible to adjust the radial position of the hook 17a, and thus to adjust the tension in the cord 16a. In combination, the hook 17a and the nut 17b serve to secure the fastener 17 to the movable divergent segment 14. Thus, the fasteners 17 form means for fastening the stiffener 16 to the movable divergent segment 14, while the nuts 17b form means for adjusting the tensioned prestress in the stiffener 16.

Figure 5:
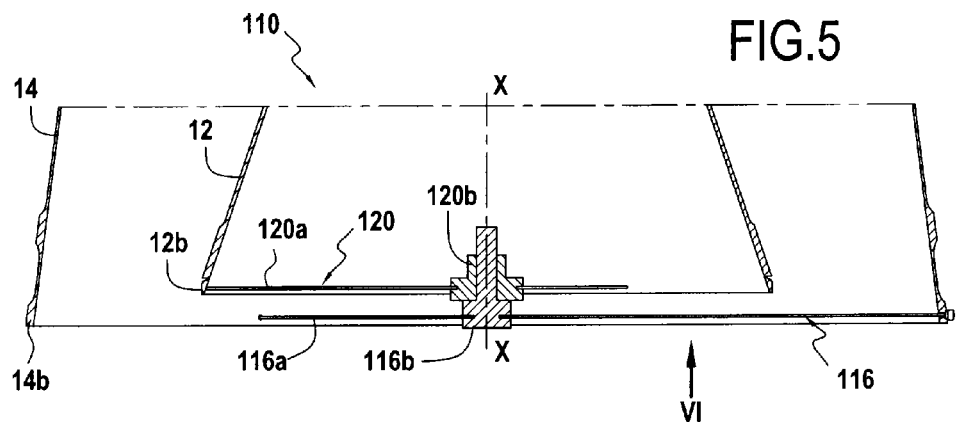
FIG. 5 shows a second embodiment of the deployable nozzle of the invention, shown in part.
Figure 6:
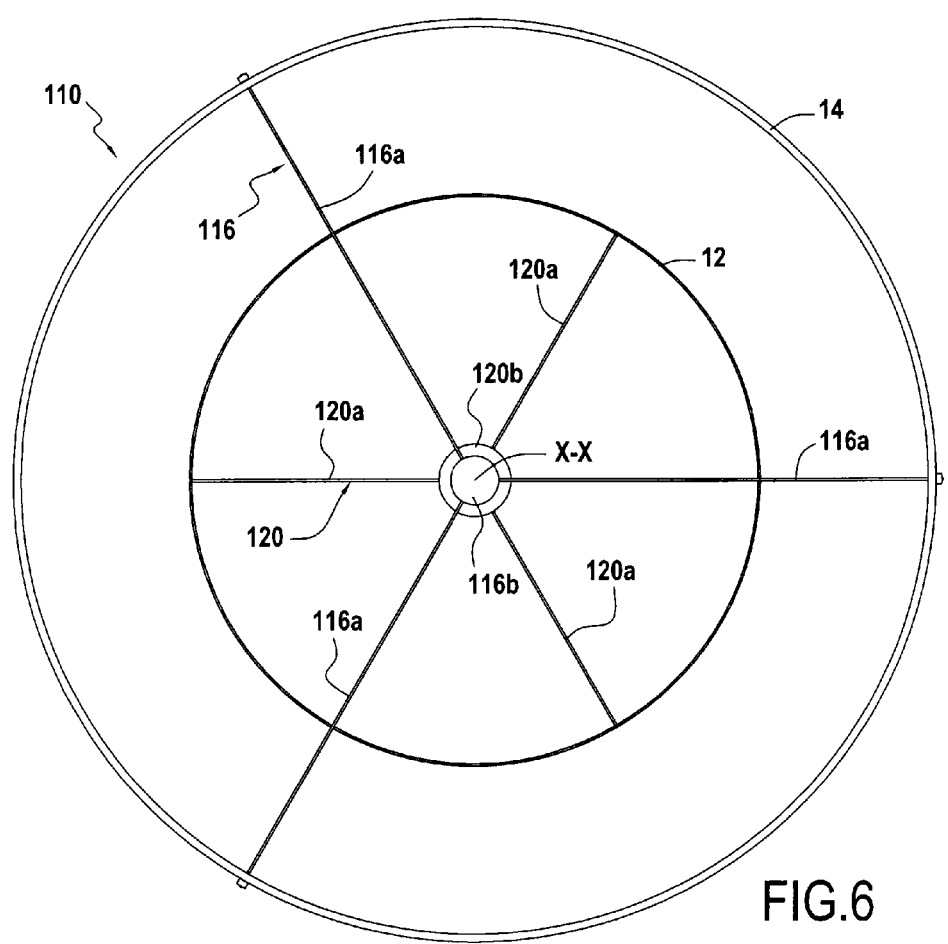
FIG. 6 shows the FIG. 5 deployable nozzle seen looking in the axial direction along arrow VI of FIG. 5.

FIGS. 5 and 6 show a second embodiment of the deployable nozzle of the invention, in the retracted position. Portions that are common with the first embodiment are not described again and they are given the same reference signs.

The deployable nozzle 110 has a first transverse stiffener 116 arranged in the vicinity of the downstream end 14b of the movable divergent segment 14, and a second transverse stiffener 120 arranged in the vicinity of the downstream end 12b of the stationary divergent segment 12. The first stiffener 116 extends in a transverse plane of the movable divergent segment 14, i.e. a plane that is perpendicular to the axis X, while the second stiffener 120 extends in a transverse plane of the stationary divergent segment 12, i.e. a plane that is perpendicular to the axial direction X. The first stiffener 116 has three aramid fiber cords 116a forming three radial ties. Each cord 116a has two ends, namely a first end connected to a primary central body 116b made of aramid fibers and a second end connected to a point at the periphery of the inside wall of the movable divergent segment 14. Likewise, the second stiffener 120 has three aramid fibers cords 120a forming three radial ties. Each cord 120a presents two ends, namely a first end connected to a secondary central body 120b of rigid synthetic material such as nylon, and a second end connected to a point of the periphery of the inside wall of the stationary divergent segment 12. Naturally, in a variant, the first and/or second stiffener could have two radial cords or more than three radial cords. The cords 116a and 120a extend along radii respectively of the movable and the stationary divergent segments 14 and 12.

The primary central body 116b is a body of revolution about the axis X, and it presents an axially-projecting rod and an annular portion that extends radially and that has the cords 116a fastened thereto. The secondary central body 120b is a body of revolution about the axis X presenting an axial central hole and an annular portion that extends radially and that has the cords 120a fastened thereto. The rod of the primary central body 116b cooperates with the central hole of the secondary central body 120b by engaging therein. Thus, when the deployable nozzle is in the retracted position, as shown in FIG. 5, the rod of the primary central body 116b is engaged in the hole in the secondary central body 120b. When the nozzle moves into its deployed position, the movement in translation of the movable divergent segment 12 downstream along the direction X disengages the rod of the primary central body 116b from the hole in the secondary central body 120b. Naturally, in a variant, the rod could be arranged on the secondary central body while the hole is arranged in the primary central body. In yet another variant, a plurality of rods could engage respectively in a plurality of holes in the retracted position.

FIG. 6 shows the azimuth distribution of the cords 116a and 120a of the first and second stiffeners 116 and 120. Each of the cords is regularly spaced apart at 120° (one hundred twenty degrees of angle). The cords of the second stiffener 120 are offset in the azimuth direction by 60° (sixty degrees of angle) relative to the cords 116a of the first stiffener. More generally, when the first and second stiffeners present the same odd number of cords, the cords of the second stiffener are offset in the azimuth direction so as to extend radially opposite from the cords of the first stiffener.

Figure 7:
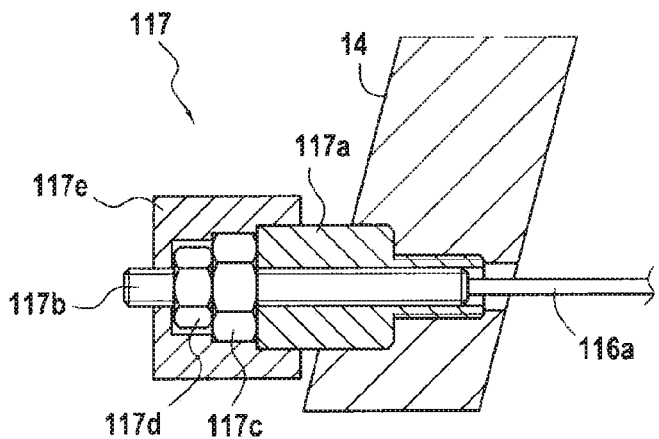
FIG. 7 shows a fastener of the stiffener of the FIG. 5 deployable nozzle.

FIG. 7 shows a fastener 117 for attaching the cords 116a to the movable divergent segment 14. The fasteners of the cords 120a of the stationary divergent segment 12 are identical. The fastener 117 comprises a bushing 117a screwed onto the movable divergent segment 14. The fastener 117 is thus secured to the movable divergent segment 14. This bushing 117a is tubular and has passing therethrough an endpiece 117b that is crimped onto the end of the cord 116a. The endpiece 117b can slide in the bushing 117a. An adjustment nut 117c is screwed onto a thread on the endpiece 117b and cooperates with the bushing 117a by bearing thereagainst, thus making it possible firstly to prevent the endpiece 117a from moving in translation towards the inside of the movable divergent segment 14, and secondly to adjust the tension prestress in the cord 116a. A lock nut 117d holds the adjustment nut 117c in place. A protective cap 117e protects the nuts 117c and 117d, in particular against infiltration of water. The fasteners 117 form means for fastening the stiffener to the movable divergent segment, while the adjustment nuts 117c form means for adjusting the tension prestress.

Naturally, the fastener 117 of the second embodiment could be used instead of the fasteners 17 of the first embodiment, and vice versa.

Figure 8:
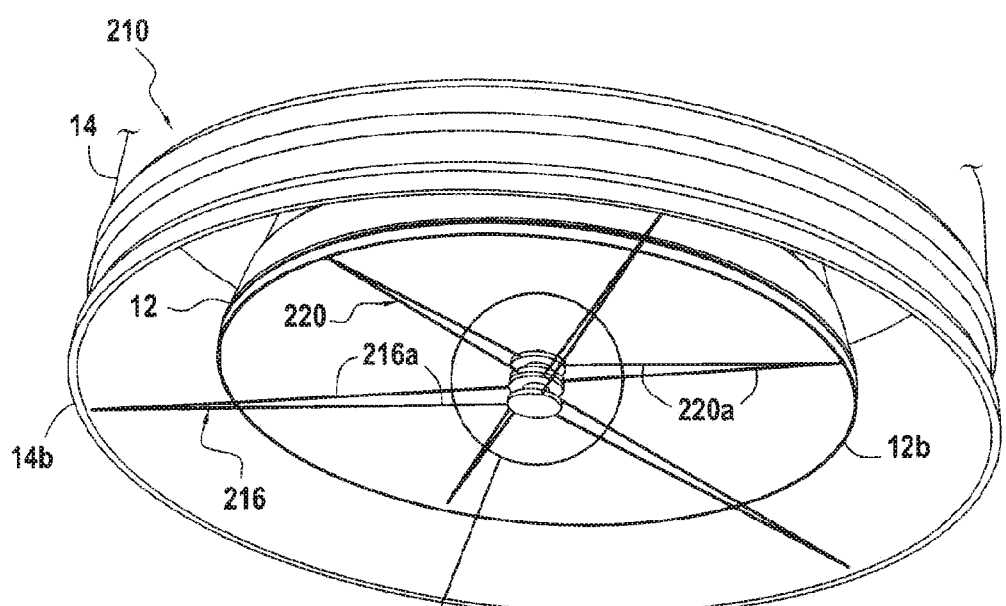
FIG. 8 shows a third embodiment of the deployable nozzle of the invention, shown in part.

FIG. 8 shows a third embodiment of the deployable nozzle of the invention. Portions in common with the first and second embodiments are not described again and they are given the same reference sign.

The deployable nozzle 210 presents a first transverse stiffener 216 arranged in the vicinity of the downstream end 14b of the movable divergent segment 14, and a second transverse stiffener 220 arranged in the vicinity of the downstream end 12b of the stationary divergent segment 12. The first stiffener 216 extends in a transverse plane of the movable divergent segment 14, i.e. a plane that is perpendicular to the axial direction X, while the second stiffener 220 extends in a transverse plane of the stationary divergent segment 12, i.e. a plane that is perpendicular to the axial direction X.

In order to compensate for the axial spacing between the downstream end 12b of the stationary divergent segment 12 and the downstream end 14b of the movable divergent segment 14, each stiffener has two series of cords connected to a central body, each cord being duplicated. Thus, each central body is offset axially relative to the plane defined by the points to which the stiffeners are connected.

Each central body presents two annular portions extending radially and spaced apart axially, a first series of cords being connected to a first annular portion while a second series of cords, duplicating the first series of cords, is connected to the second annular portion. It can thus be understood that two cords extend radially from the primary central body 216b or from the secondary central body 220b in a common radial plane towards a common point of the inside wall of the movable or stationary divergent segment 14 or 12. Thus, each stiffener 216 and 220 presents two series of three cords 216a and 220a, with each cord in one series duplicating a cord in the other series. The azimuth distribution of the cords 216a and 220a is similar to the distribution of the cords 116a and 120a of the second embodiment, as shown in FIG. 6. Naturally, in a variant, the stiffeners 216 and/or 220 may present two series of two cords or of more than three cords. The cords 216a and 220a are attached respectively to the movable and stationary divergent segments 14 and 12 by means of fasteners 17 (cf. FIG. 4). Naturally, in a variant, the fasteners 117 (cf. FIG. 7) could replace the fasteners 17.

In the same manner as for the second embodiment, the primary central body 216b and the secondary central body 220b cooperate by an axial rod engaging in a central hole while the deployable nozzle is in its retracted position, and the rod becomes disengaged from the hole when the deployable nozzle moves into its deployed position.

Although the present invention is described with reference to specific embodiments, it is clear that modifications and changes may be carried out on the embodiment without going beyond the general scope of the invention as defined by the claims. In particular, individual characteristics of the various embodiments shown may be combined in additional embodiments. Consequently, the description and the drawings should be considered in an illustrative sense rather than a restrictive sense.

The invention claimed is:

1. A deployable nozzle for a rocket engine, the nozzle comprising:
    at least a stationary divergent segment;
    a movable divergent segment that is coaxial about the stationary divergent segment and is configured to move along the stationary divergent segment from a retracted position towards a deployed position; and
    a transverse stiffener that is prestressed in tension and that extends transversely relative to the movable divergent segment in a vicinity of a downstream end of the movable divergent segment between at least two points at a periphery of an inside wall of the movable divergent segment.

2. A deployable nozzle according to claim 1, wherein the transverse stiffener extends in a transverse plane of the movable divergent segment.

3. A deployable nozzle according to claim 1, wherein the transverse stiffener comprises at least one tie extending diametrically and having two ends, each end being connected to a point of the periphery of the inside wall of the movable divergent segment.

4. A deployable nozzle according to claim 1, wherein the transverse stiffener comprises at least two ties extending radially from a primary central body.

5. A deployable nozzle according to claim 1, wherein the transverse stiffener comprises adjustment means for adjusting a prestress tension.

6. A deployable nozzle according to claim 1, wherein the transverse stiffener comprises at least one cord made of polymer fibers.

7. A deployable nozzle according to claim 1, wherein the transverse stiffener comprises fastener means for fastening to the movable divergent segment and secured to the movable divergent segment.

8. A deployable nozzle according to claim 1, wherein, in the retracted position, the transverse stiffener cooperates with a downstream end portion of the stationary divergent segment.

9. A deployable nozzle according to claim 1, wherein the stationary divergent segment and the movable divergent segment include, in a vicinity of their downstream ends, complementary centering means that cooperate with each other in the retracted position.

10. A deployable nozzle according to claim 9, wherein the transverse stiffener carries an annular centering skirt that cooperates with a downstream end portion of the stationary divergent segment in the retracted position by mutually engaging therewith.

11. A deployable nozzle according to claim 9, wherein the transverse stiffener comprises at least two ties extending radially from a primary central body while the downstream end of the stationary divergent segment carries a secondary central body with which the primary central body cooperates in the retracted position by mutual engagement therewith.

12. A deployable nozzle according to claim 11, wherein the stationary divergent segment includes a further transverse stiffener prestressed in tension comprising at least two ties extending radially in a vicinity of a downstream end of the stationary divergent segment, between at least two points of a periphery of an inside wall of the stationary divergent segment from the secondary central body.

13. A rocket engine comprising at least one deployable nozzle according to claim 1.

* * * * *